United States Patent [19]

Koshimura et al.

[11] 4,388,561
[45] Jun. 14, 1983

[54] APPARATUS FOR OPERATING DISCHARGE LAMPS

[75] Inventors: Yasunobu Koshimura, Tokyo; Hisao Kobayashi, Fujisawa; Nanjou Aoike, Yokohama, all of Japan

[73] Assignee: Toshiba Electric Equipment Corporation, Tokyo, Japan

[21] Appl. No.: 237,269

[22] Filed: Feb. 23, 1981

[51] Int. Cl.$^3$ .............................................. H05B 41/29
[52] U.S. Cl. .................................. 315/171; 315/173; 315/174; 315/224; 315/226; 315/247; 315/DIG. 7
[58] Field of Search ................................ 315/171–176, 315/205, 209 R, 219, 224, 247, 291, DIG. 7, 226; 307/44, 75, 82

[56] References Cited

U.S. PATENT DOCUMENTS

| 4,017,785 | 4/1977 | Perper | 315/DIG. 7 |
| 4,042,856 | 8/1977 | Steigerwald | 315/205 X |
| 4,109,307 | 8/1978 | Knoll | 315/247 X |

OTHER PUBLICATIONS

IES Transaction, Dec. 1969; "Initial Characteristics of High-Intensity Discharge Lamps on High-Frequency Power," John H. Campbell, pp. 713–722.

Primary Examiner—Eugene R. LaRoche
Attorney, Agent, or Firm—Oblon, Fisher, Spivak, McClelland & Maier

[57] ABSTRACT

A low frequency AC voltage is rectified through a full-wave rectifier to obtain a pulsating voltage, which is superimposed with an auxiliary voltage of a predetermined level provided from an auxiliary power source, and the resultant composite pulsating voltage is inverted at an inverter to a high frequency voltage. The high frequency voltage thus obtained from the inverter is used to operate a discharge lamp. Minimum value $V_{min}$ of the resultant voltage is set to be $\frac{1}{3}$ to 4/5 of the maximum value $V_{max}$ of the resultant voltage.

5 Claims, 14 Drawing Figures

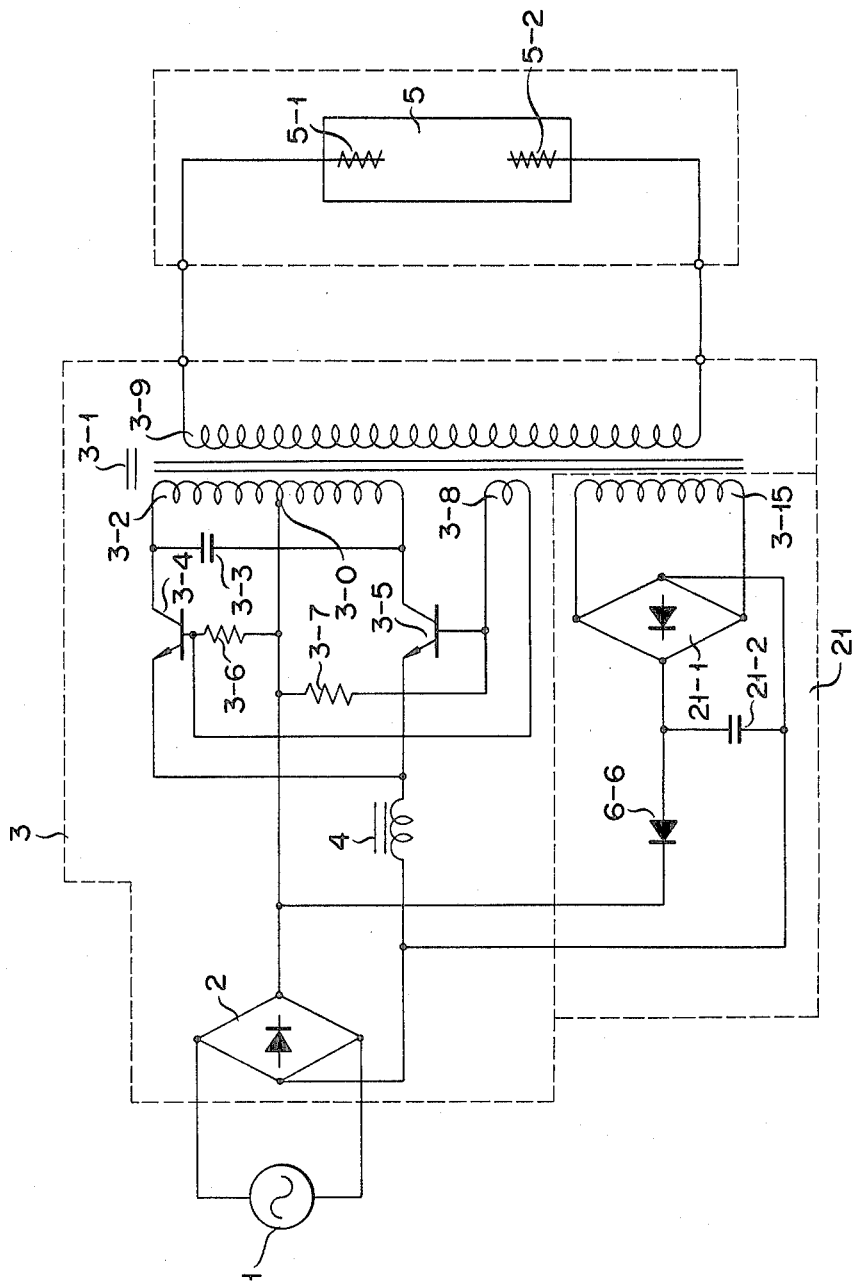

APPARATUS FOR OPERATING DISCHARGE LAMPS

This invention relates to apparatus for operating a discharge lamp with a pulsating voltage.

A discharge lamp may be operated using the 50 Hz or 60 Hz commercially available AC power source by full-wave rectifying the AC voltage, obtaining from the pulsating voltage thus obtained a high frequency voltage having the envelope of the voltage waveform of the pulsating voltage using an inverter and using the high frequency voltage as a lamp operating voltage. By this method, while the high frequency voltage is being applied, the discharge lamp can be continuously lit since the lamp energizing cycle period is shorter than the ion re-excitation period of the lamp. However, since the pulsating voltage is a low frequency wave having the frequency of 100 Hz or 120 Hz, for example, the high frequency voltage is zero at the time of the zero level of the low frequency voltage, and during this period the lamp is not lit. During this pause period of lamp, energy is consumed by the re-excitation of ions, so that the lamp efficiency or light emission efficiency is reduced that much. For example, it has been found that with a 250 watt mercury lamp the light emission efficiency obtainable with the high frequency voltage lamp operation system mentioned above is lower by 10% than that obtainable with a DC high frequency voltage lamp operation system.

In order to improve the light emission efficiency, it may be conceived to operate a discharge lamp by coupling a full-wave rectified voltage (i.e., pulsating voltage) that is obtained from a commercial AC voltage to a smoothing circuit to obtain a DC voltage and driving an inverter with this DC voltage to obtain a DC high frequency voltage for use as the lamp operation voltage.

In this case, however, a capacitor of a large capacitance is required for the smoothing circuit and greatly reduces the power factor of the lamp operating circuit, and also it is undesired from the standpoint of reducing the size and cost.

SUMMARY OF THE INVENTION

An object of the invention is to provide apparatus for operating a discharge lamp, which can operate a discharge lamp with satisfactory lamp efficiency and circuit power factor.

According to the invention, the above objective is achieved by apparatus for operating a discharge lamp comprising rectifying means for rectifying a low frequency AC voltage to obtain a pulsating voltage, an inverter for inverting the pulsating voltage to a high frequency voltage and means for operating a discharge lamp according to the output of the inverter, in which an auxiliary power source for generating an auxiliary voltage and a switch circuit for adding the auxiliary voltage to the pulsating voltage to have a resultant voltage only while the pulsating voltage is lower than the auxiliary voltage are provided, minimum value $V_{min}$ of the resultant voltage and the maximum value $V_{max}$ of the resultant voltage being set to meet a condition $$4/5\, V_{max} \geq V_{min} \geq \tfrac{1}{3} V_{max}.$$

BRIEF DESCRIPTION OF THE DRAWINGS

This invention can be more fully understood from the following detailed description when taken in conjunction with the accompanying drawings, in which:

FIG. 9 is a circuit diagram showing a specific circuit construction of a further embodiment of the invention.

DETAILED DESCRIPTION OF THE PREFERRED EMBODIMENTS

Figure 1:
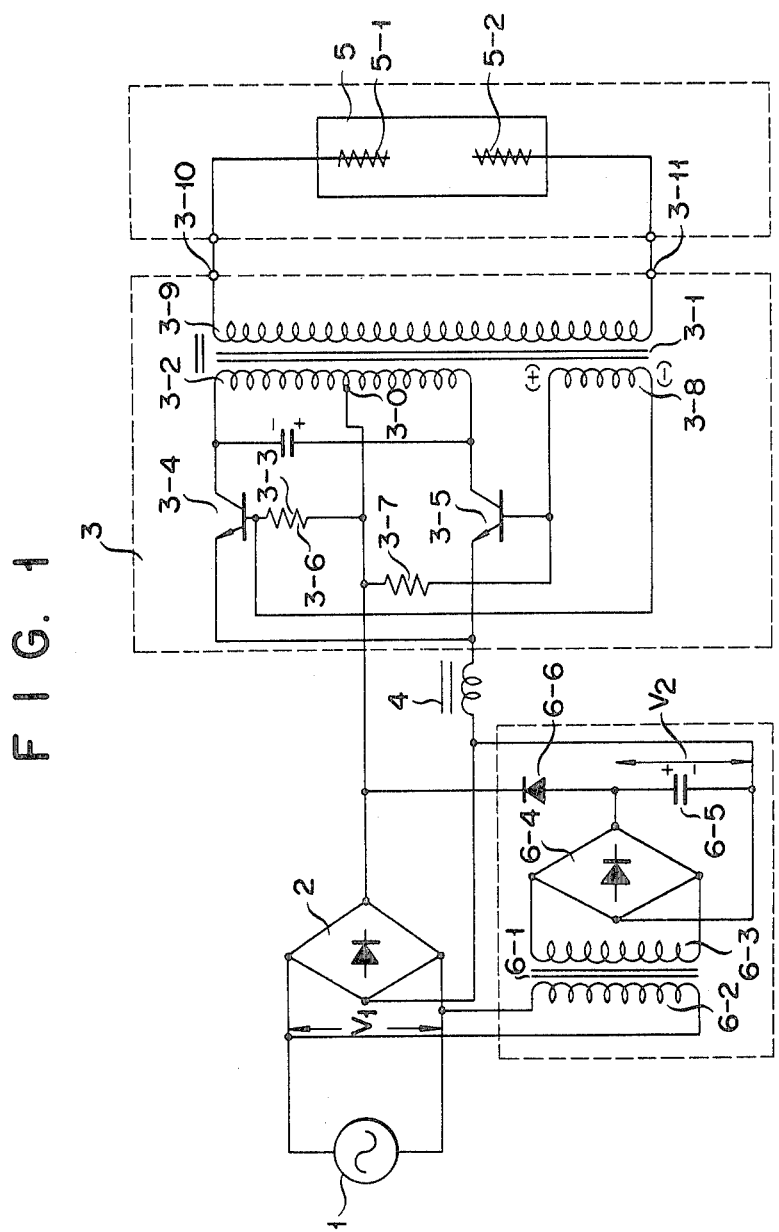
FIG. 1 is a circuit diagram showing an embodiment of the apparatus for operating discharge lamps according to the invention.

Referring now to FIG. 1, designated at 1 is a low frequency AC power source, for instance a 50 Hz, 200 volt commercial power source. The output terminals of the AC power source 1 are connected to the AC input terminals of a full-wave rectifier 2 formed by four diodes. The positive side output terminal of the full-wave rectifier 2 are connected to a center tape 3-0 of the primary winding 3-2 of a transformer 3-1 in an inverter 3. A capacitor 3-3 is connected between the opposite terminals of the primary winding 3-2. Of these terminals, one is connected to the collector of a transistor 3-4, and the other to the collector of a transistor 3-5. The transistors 3-4 and 3-5 have their bases connected through respective resistors 3-6 and 3-7 to the positive output terminal of the full-wave rectifier 2 and their emitters commonly connected to one end of a choke coil 4, which has its other end connected to the negative output terminal of the full-wave rectifier 2. The transformer 3-1 also includes a second primary winding 3-8 and a secondary winding 3-9. The second primary winding 3-8 has its one end connected to the base of the transistor 3-4 and other end connected to the base of the transistor 3-5. A discharge lamp 5 has its one electrode 5-1 connected to one end 3-10 of the secondary winding 3-9 and the other electrode 5-2 connected to the other end 3-11 of the secondary winding 3-9. The transformer 3-1 is of a leakage type having leakage inductance functioning as a current limiting component for the discharge lamp.

The output terminals of the AC power source 1 are connected to the opposite ends of the primary winding 6-2 of a step-down transformer 6-1 of an auxiliary DC power source 6. The secondary winding 6-3 of the transformer 6-1 are connected to AC input terminals of a full-wave rectifier 6-4 which is formed by four diodes. The pulsating voltage output terminals of the rectifier 6-4 are connected to the opposite terminals of a smoothing capacitor 6-5. The capacitor 6-5 has its positive terminal connected to an anode electrode of a diode 6-5 the cathode electrode of which is connected to the positive output terminal of the full-wave rectifier 2. The negative terminal of the rectifier 6-4 is connected to the negative output terminal of the rectifier 2.

The operation of the circuit of FIG. 1 will now be described with reference to FIGS. 2A to 2D. The 50 Hz AC voltage from the AC power source 1 has a peak-to-peak level $V_1$, and the full-wave rectifier 2 full-wave rectifies this voltage to obtain a pulsating voltage of a peak level $V_{\frac{1}{2}}$ or $V_{max}$ as shown in 2A.

Figure 2A:
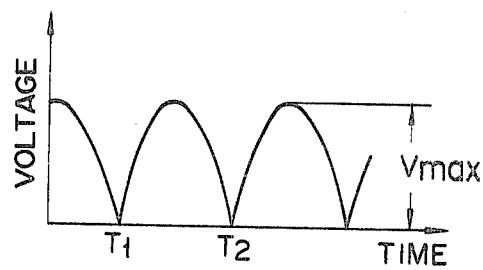
FIGS. 2A and 2D show waveform charts for illustrating the functions of the apparatus shown in FIG. 1.
Figure 2B:
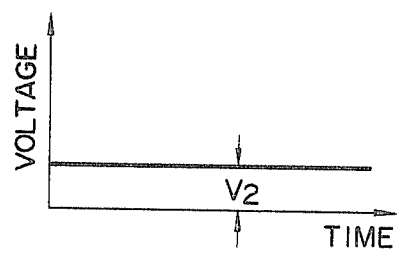

Meanwhile, the AC voltage $V_1$ is stepped down through the transformer 6-1 to have a certain voltage, and this stepped down AC voltage is smoothed through the capacitor 6-5. Thus, a DC voltage of substantially $V_2$ as shown in FIG. 2B is obtained across the capacitor 6-5.

This DC voltage $V_2$, as will be described later, is set to be above at least one-third of the peak value $V_{max}$ of the pulsating voltage, so that the pulsating voltage is lower than $V_2$ in the neighborhood of instants $T_1$, $T_2$, . . ., at which the pulsating voltage is zero. Every time the pulsating voltage becomes lower than $V_2$, the diode switch 6-6 is rendered conductive, so that DC voltage $V_2$ is superimposed upon the pulsating voltage. The resultant voltage has a waveform as shown in FIG. 2C, and it is supplied to the inverter 3.

Figure 2C:
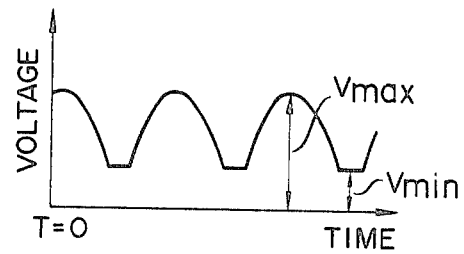
Figure 2D:
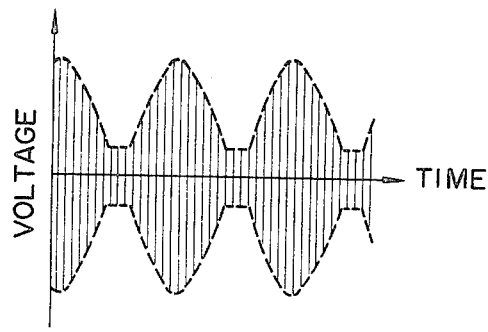

The inverter 3 generates a voltage output at a high frequency, for instance 100 KHz, and having the envelope of the input voltage waveform of FIG. 2C. When a voltage as shown in FIG. 2C, of the illustrated polarity at T=0, is induced across the primary winding 3-8, the transistor 3-4 becomes "off" while the transistor 3-5 becomes "on", so that current flows from the center tap 3-0 of the primary winding 3-2 into the transistor 3-5, thus providing the high frequency voltage half cycle of one polarity in the secondary winding 3-9 of the transformer 3-1. With this current from the center tap 3-0 to the transistor 3-5, the capacitor 3-3 is charged to the illustrated polarity, while the primary winding 3-8 is excited in the opposite direction to generate voltage of the opposite polarity to that illustrated. As a result, the transistor 3-4 is triggered while the transistor 3-5 is cut off, thus causing current to pass from the tap 3-0 into the transistor 3-4 to let the secondary winding 3-9 provide the high frequency voltage half cycle of the opposite polarity. The capacitor 3-3 is thus charged to the opposite polarity to that illustrated, and the voltage of the illustrated polarity is generated in the primary winding 3-8. As the transistors 3-4 and 3-5 are alternately turned on and off, a high frequency voltage corresponding to their on-off cycle period appears as inverter output across the secondary winding 3-9 of the transformer 3-1. FIG. 2D shows the waveform of this inverter output. Since the output voltage of the inverter 3 corresponds to the primary input voltage to the transformer 3-1, having the waveform as shown in FIG. 2C, its envelope corresponds to that shown in FIG. 2C. In this case, the lamp current of the discharge lamp 5 has a waveform similar to that of the output voltage of the inverter 3. The output of the inverter 3 is impressed across the electrodes 5-1 and 5-2 of the discharge lamp 5. The discharge lamp 5 is supplied with a high frequency voltage, for instance at 100 KHz, so that it is energized with a cycle period shorter than the internal ion re-excitation period and is continuously lit. In addition, since the minimum voltage of the driving voltage supplied to the inverter 3 is set to correspond to the DC voltage $V_2$ equal to or higher than one-third of the peak voltage $V_{max}$, so that practically no extra energy for ion re-excitation is required even during the low voltage period. Thus, it is possible to eliminate pause period of the lamp operation, which would reduce the lamp efficiency.

Now, the reason why the DC voltage $V_2$ is set to be equal to or above one-third of the peak value $V_{max}$ of the pulsating voltage will be discussed.

Figure 3:
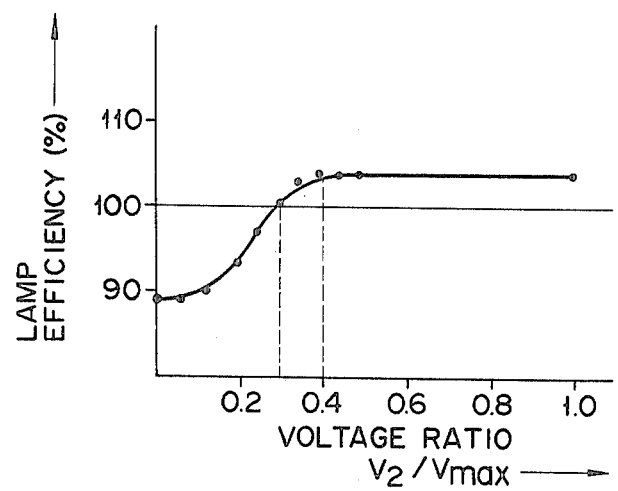
FIGS. 3 to 6 and 7A to 7C are graphs illustrating the scope of the invention.

FIG. 3 shows a characteristic curve of a lamp efficiency versus voltage ratio obtained with respect to a mercury lamp as the discharge lamp. In this case, a rated lamp power is 250 watts and the rated lamp voltage is 130 volts. Further, a lamp efficiency which is achieved by using a conventional low frequency ballast with a secondary no-load voltage of 200 volts is set at 100% in this characteristic curve. This is true also in the cases of FIGS. 4 to 6. In the Figure, the ordinate is taken for the lamp efficiency (in %), and the abscissa is taken for the voltage ratio $V_2/V_{max}$. As the lamp operating circuit the embodiment of FIG. 1 has been used, and a 50 Hz power source as the source 1. It will be seen from FIG. 3 that when the 100 (%) lamp efficiency is the permissible efficiency, the voltage ratio is about 0.3. With the decrease of the voltage ratio from 0.3 the lamp efficiency is sharply reduced. Thus the voltage ratio should be set to be above 0.3, that is, $V_2$ should be $$V_2 \geq \tfrac{1}{3} V_{max}.$$

Figure 4:
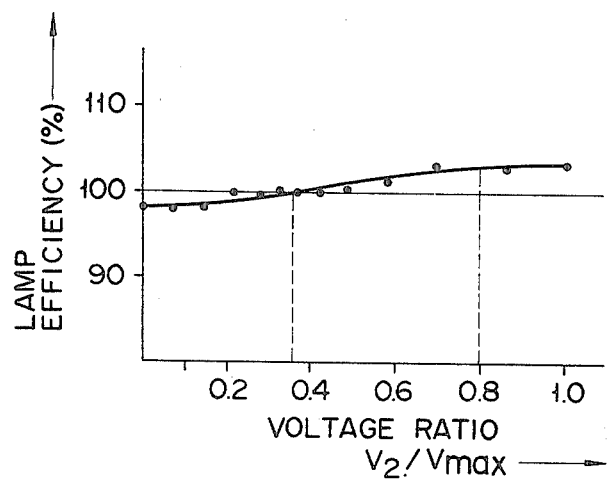

FIG. 4 shows a similar lamp efficiency versus voltage ratio plot obtained with a metal halide lamp of 250 watt rated lamp power and 130 volt rated lamp voltage. In this case again a voltage ratio of about 0.35 corresponds to the 100% lamp efficiency.

Figure 5:
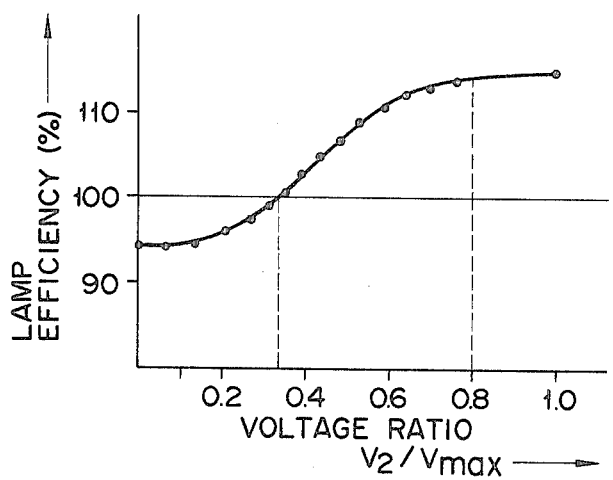
Figure 6:
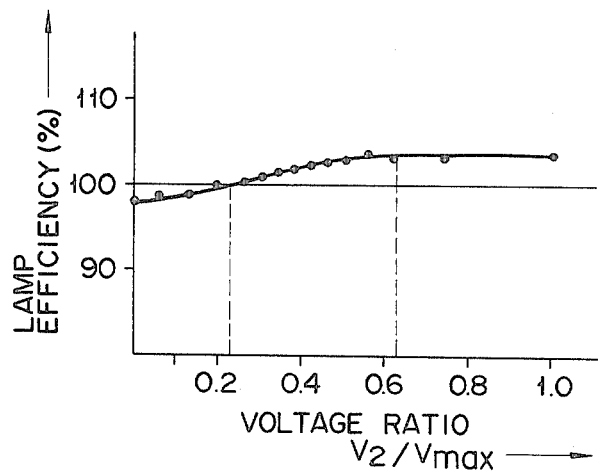

FIG. 5 shows a plot obtained with a high pressure sodium lamp of 250 watt rated lamp power and 95 volt rated lamp voltage, and FIG. 6 shows a plot obtained with a fluorescent lamp of 110 watt lamp power and 155 volt rated lamp voltage. In either case, a voltage ratio of around 0.3 corresponds to the 100% lamp efficiency.

It will be seen from any of the above plots that for providing a lamp efficiency in excess of 100% of the DC voltage $V_2$ should be $V_2 \geq \tfrac{1}{3} V_{max}$. The value of the voltage $V_2$ varies with the change of the discharging period of the capacitor 5-5 and the minimum value of the voltage $V_2$ during the discharging period should be so set as to satisfy the relation $V_2 \geq \tfrac{1}{3} V_{max}$.

In the meantime, it is to be noted that in any of the characteristic curves of FIGS. 3 to 6 that the lamp efficiency is practically constant for voltage ratio values above a certain value. While the voltage ratio may be set to any value above 0.3 so far as the lamp efficency alone is considered, for the operation of this kind of discharge lamp as high power factor of the lamp operation circuit as possible is required together with the high lamp efficiency. Usually, the power factor of more than 85% is desired in this type of lamp operation circuit.

Figure 7A:
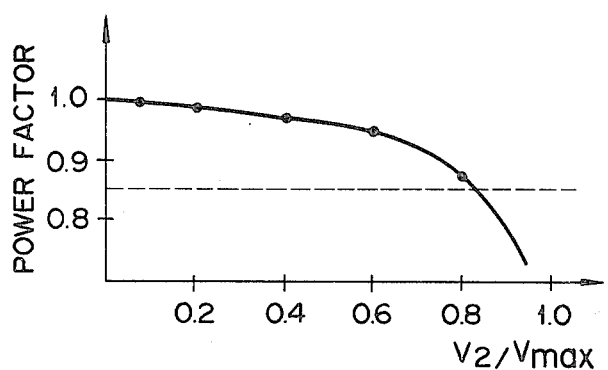
Figure 7B:
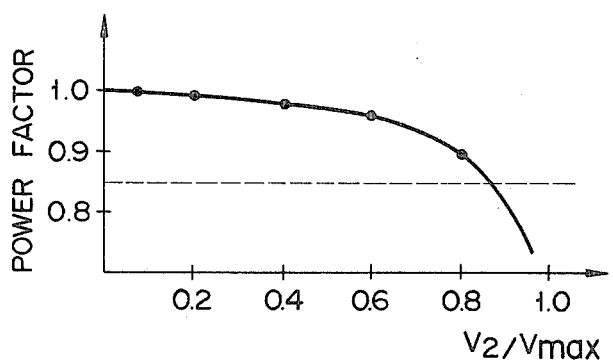
Figure 7C:
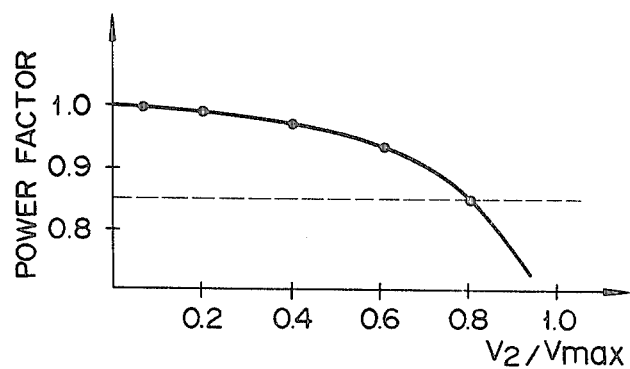

The power factor of the circuit of the embodiment of FIG. 1 depends upon the step-down ratio of the transformer 6-1 and the capacitance of the smoothing capacitor 6-5 used in the DC power source 6. By setting the output voltage of the transformer 6-1 high and the capacitance of the capacitor 6-5 large, the ratio of $V_2$ and $V_{max}$ will become approximately 1 to operate the discharge lamp 5 in a range in which the lamp efficiency is saturated as shown in FIGS. 4 to 6. In this case, however, the circuit power factor remarkably raduces. FIG. 7A to FIG. 7C show characteristic curves of the circuit power factor versus the voltage ratio of $V_2$ and $V_{max}$. The characteristic curve with respect to a mercury lamp and a metal halide lamp is shown in FIG. 7A. Those of high-pressure sodium lamp and the fluorescent lamp are shown in FIG. 7B and FIG. 7C, respectively. Though the characteristic of FIGS. 7A to 7B slightly differ with the lamp voltage of the discharge lamp 5, the differences thereof can be negligible. As is evident from FIGS. 7A to 7C, the voltage ratio $V_2/V_{max}$ should be set not larger than 0.8. When the voltage ratio is larger than 0.8, the circuit power factor will reduce remarkably and a so-called high power factor of 0.85 can not be realized. While the use of a combination of inductance and capacitance for improving the power factor is conceivable, pronounced power factor improvement cannot be expected in this case, and the size and cost of the apparatus become inevitably large.

Figure 8:
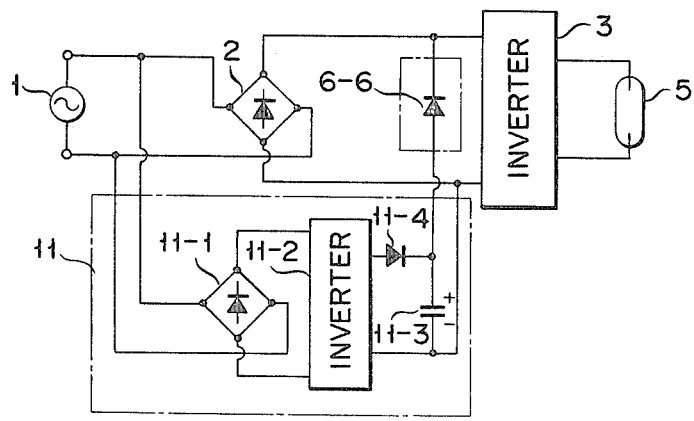
FIG. 8 is a circuit diagram, partly in block form, showing a different embodiment of the invention.

While in the above embodiment of FIG. 1 the DC power source 6 has been formed by the transformer 6-1, full-wave rectifier 6-4 and smoothing capacitor 6-5, this is by no means limitative. For example, a DC power source as shown in FIG. 8, including a full-wave rectifier 11-1, an inverter 11-2, a smoothing capacitor 11-3 and a rectifying diode 11-4, may be employed as well. In FIGS. 1 and 8, like parts are designated by like reference numerals.

In FIG. 8, the inverter 3 is the same as that in FIG. 1 and simply shown as a block. The inverter 11-2 is also shown as a block for the same reason. The AC voltage from the AC power source 11 is impressed between the AC input terminals of the full-wave rectifying circuit 11-1, and a pulsating voltage is obtained from the DC output terminals thereof. The pulsating voltage is coupled to the inverter 11-2, whereby a high frequency voltage having the envelope of pulsating voltage waveform is obtained. The amplitude of the high frequency voltage can be appropriately set depending upon the turns ratios of the primary and secondary windings of the transformer employed in the inverter 11-2 (corresponding to the transformer 3-1 in the case of the FIG. 1 circuit). The output of the inverter 11-2 is rectified through the diode 11-4 and smoothed through the capacitor 11-3 to obtain the DC voltage $V_2$ coupled to the diode switch 6-6.

FIG. 9 shows an embodiment which is provided with a different DC power source 21 for obtaining the DC voltage $V_2$. In FIGS. 1 and 9 like parts are designated by like reference numerals. In this embodiment, part of the output of the inverter 3 is used as power for the DC power source 21. A transformer 3-1 in the inverter 3 includes a second secondary winding 3-15 which is connected between the AC input terminals of a full-wave rectifier 21-1. The DC output terminals of the full-wave rectifier 21-1 are connected across a smoothing capacitor 21-2, and the positive side terminal thereof is connected through a switching diode 6-6 to the positive output terminal of the full-wave rectifier 2.

In operation, a high frequency output, for instance at 100 KHz, obtained from the secondary side of the transformer 3-1 in the inverter 3 is set to a predetermined amplitude by the secondary winding 3-15 and rectified by the full-wave rectifier 21-1 to obtain a pulsating voltage, which is smoothed through the smoothing capacitor 21-2 to obtain DC voltage $V_2$. The remaining part of operation is the same as in the embodiment of FIG. 1.

In the embodiment of FIG. 8 the transformer 6-1 shown in FIG. 1 can be omitted, and in the embodiment of FIG. 9 the inverter 11-2 shown in FIG. 8 is omitted. Thus, the circuit construction can be simplified.

Also, while in the above embodiments the diode switch 6-6 has been used to superimpose the DC voltage $V_2$ on the pulsating voltage obtained from the full-wave rectifier 2, it is possible to use in lieu of the diode switch 6-6 a thyristor which is on-off phase controlled for switching the DC voltage $V_2$.

What we claim is:

1. Appparatus for operating a discharge lamp comprising:
   rectifying means for rectifying a low frequency AC voltage to obtain a pulsating voltage;
   an auxiliary power source for generating an auxiliary voltage;
   a switch circuit for adding said auxiliary voltage to said pulsating voltage in order to produce a resultant voltage only when said pulsating voltage is lower than said auxiliary voltage, with the minimum value $V_{min}$ of the resultant voltage and the maximum value $V_{max}$ of said resultant voltage being set to meet a condition such that $\frac{2}{3}V_{max} \geq V_{min} \geq \frac{1}{3} V_{max}$;
   an inverter for inverting said added auxiliary voltage and pulsating voltage to a high frequency voltage; and
   means for operating a discharge lamp according to the output of said inverter.

2. Apparatus for operating a discharge lamp according to claim 1, characterized in that said auxiliary power source includes a transformer for stepping down the low frequency AC voltage to a predetermined level, a second rectifier for rectifying the secondary output voltage of said transformer, and a smoothing circuit including at least a smoothing capacitor for smoothing the output voltage of said rectifier and supplying the smoothed DC voltage to said switch circuit.

3. Apparatus for operating a discharge lamp according to claim 1, characterized in that said auxiliary power source includes a second rectifier for rectifying the low frequency AC voltage, a second inverter driven by the pulsating voltage output of said second rectifier to generate a high frequency voltage, and a third rectifier including a capacitor and a diode for rectifying and smoothing the output voltage of said second inverter to obtain a DC voltage of a predetermined level and supplying said DC voltage to said switch circuit.

4. Apparatus for operating a discharge lamp according to claim 1, characterized in that said auxiliary power source includes a secondary winding provided in said inverter, a second rectifier for rectifying a high frequency voltage generated in said secondary winding and a smoothing capacitor for smoothing the pulsating voltage output of said second rectifier, a smoothed DC voltage thus obtained being supplied to said switch circuit.

5. Apparatus for operating a discharge lamp according to any one of claims 1 or 4, characterized in that said switch circuit has the anode connected to the positive output terminal of said auxiliary power source and the cathode connected to the positive output terminal of said rectifier.

* * * * *